United States Patent Office 3,018,161
Patented Jan. 23, 1962

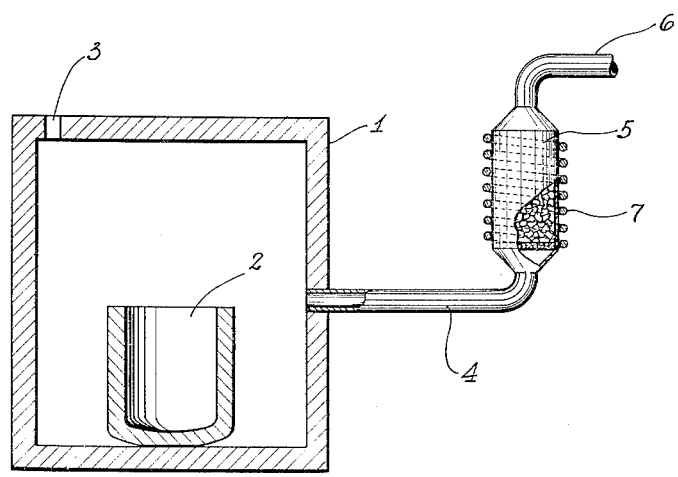

3,018,161
REMOVAL OF RUTHENIUM AND CESIUM
Woodland E. Erlebach and Danny T. Nishimura, Deep River, Ontario, Canada, assignors to Atomic Energy of Canada Limited, Ottawa, Ontario, Canada, a company of Canada
Filed Nov. 25, 1958, Ser. No. 776,373
7 Claims. (Cl. 23—35)

This invention relates to the decontamination of gases and vapours containing volatile radioactive elements, particularly ruthenium and cesium.

The object of the present invention is to decontaminate gases and vapours by capturing as thermally stable compounds ruthenium and cesium which are volatilized during the heating of materials containing the radioactive elements.

For ease of understanding, the method of the invention will be described with reference to the accompanying drawing which illustrates a form of apparatus which may be used.

In the drawing 1 represents a furnace in which a crucible 2, for the material is heated. 3 is an air inlet vent, 4 an exit tube leading to a reactor 5, and 6 a pipe leading to an exhaust fan. 7 represents a heater to raise the temperature of the reactor to above 120° C. during the passage of vapour. Temperatures of the reactor have been in excess of 1000° C. and as high as 1350° C. A preferred temperature is between 400° C. and 1000° C.

In accomplishing the object of the invention the contaminated gases and vapours arising from the charge in the heated crucible must be contacted with reagents which will react with the ruthenium and cesium to capture these radioactive elements and form thermally stable compounds.

The ruthenium is captured by a metal oxide reagent from the group consisting of iron oxide, nickel oxide, chromium oxide, cobalt oxide and titanium oxide. The reaction between the ruthenium and the oxide is irreversible, thus insuring retention of the ruthenium.

The cesium is captured by a refractory silicate. Calcium silicate in finely divided form has been found very satisfactory. The silicate must react readily with the cesium vapour and form a thermally stable compound. The reaction between the cesium and the silicate is irreversible, thus insuring retention of the cesium.

To insure efficient decontamination, adequate surface contact between these reagents and the ruthenium and cesium vapours must be provided, since this is the point at which the vapours react to form the thermally stable compound in each case. This may be accomplished in several ways. The contacting reagents may constitute an inner lining for the furnace and the passage through which the vapours pass from the crucible. They may be used in the form of a porous block or cap placed on or above the charge in the crucible so that as the vapours pass therethrough they are captured to form thermally stable compounds.

Illustrated in the drawing is a procedure where the contact reagents are arranged in a reactor through which the vapours pass from the crucible. In this procedure the contact reagents are used in the form of loose packing units in the reactor. The silicate reagent may be placed in the lower end of the reactor to first extract the cesium and the metal oxide reagent in the upper part of the reactor to extract the ruthenium, or any desired order of placing the contacting reagents may be employed. When the packing units are made from a mixture of silicate and metal oxide the packing serves to remove both ruthenium and cesium from gases and vapours at the same time.

The following examples illustrate the operation of the method. In these examples the charge comprised nepheline syenite, calcium oxide, nitric acid, and at least one of the group of radioactive elements consisting of cesium, ruthenium or a mixture of both. On heating the charge gases and vapours contaminated with one or more of the fission products were evolved.

(1) Heating a charge containing radioactive cesium in a crucible up to 1300° C. resulted in the evaporation of 5% of the cesium in the charge. However when a ¼" layer of finely divided calcium silicate was placed on the top of an identical charge in the crucible and then heating up to 1300° C. only 0.06% of the cesium escaped in the exhaust from the reactor. That is to say the silicate layer captured 98% of the volatilized cesium.

(2) Charges containing radioactive cesium, ruthenium or mixtures of both were heated in the crucible up to 1200° C. and the evolved vapours were passed through the reactor with packings 4" deep with the following results—

| Vapour velocity, ft./sec. | Reactor temperature, ° C. | Contact reagent | Captured in reactor, percent |
|---|---|---|---|
| (a) 0.4 | 1,000 | Alumino-silicate refractory | Cs 99 |
| (b) 0.2 | 1,000 | Iron oxide + alumino silicate | Ru 97.8 |
| (c) 1.0 | 800 | ----do---- | Ru 97.5 |
| (d) 2.0 | 600 | ----do---- | Ru 98.0 |
| (e) 5.0 | 400 | ----do---- | Ru 98.5 |
| (f) 0.4 | 800 | ----do---- | Ru 98.5 |
|  |  |  | Cs 99.2 |
| (g) 0.4 | 800 | Chromium oxide + alumino silicate | Ru 60.5 |
| (h) 0.4 | 800 | Nickel oxide + alumino silicate | Ru 61.3 |
| (i) 0.4 | 800 | Cobalt oxide + alumino silicate | Ru 55.5 |
| (j) 0.4 | 800 | Titanium oxide + alumino silicate | Ru 47.1 |

In commercial scale operation the difficulty of capturing radioactive elements in readily disposable form will be recognized. Since the contact material of the present method provides an irreversible reaction with the ruthenium and cesium in forming a thermally stable compound the method is conveniently operated in conjunction with the glass disposal method disclosed in Canadian Patent 555,811, issued April 8, 1958, if radioactive cesium and/or ruthenium be present.

What is claimed is:

1. The method of removing radioactive ruthenium and cesium elements from gases containing them which comprises flowing the gases in contact with at least one of a group of reagents consisting of a metal oxide from the group consisting of iron oxide, nickel oxide, chromium oxide, cobalt oxide and titanium oxide which reacts with ruthenium to form a thermally stable compound and a refractory silicate which reacts with cesium to form a thermally stable compound, the reagents being in a form to provide wide surface contact with the gases, heating the contacting reagent at a temperature of 120 to 1350° C. during passage of the gases in contact therewith to insure formation of the thermally stable reaction product containing the radio active element and separating the decontaminated gases from the reaction compound.

2. The method defined in claim 1 wherein the reagent is arranged as packing in a reactor and the gases are passed through the reactor.

3. The method defined in claim 1 wherein a layer of the reagent is arranged as packing in a reactor and the gases are passed through the reactor.

4. The method defined in claim 1 wherein a layer of the refractory silicate is placed above a mixture containing radioactive elements including cesium and the cesium is volatilized from the mixture during said heating.

5. The method defined in claim 1 wherein the contacting reagent is heated at a temperature of 400–1000° C.

6. In the removal of radioactive ruthenium from gases containing it the method which comprises contacting the gases with a reagent being a metal oxide from the group consisting of iron oxide, nickel oxide, chromium oxide, cobalt oxide and titanium oxide at a temperature of 120 to 1000° C. to cause the ruthenium to irreversibly react with the metal oxide and form a thermally stable compound containing it and separating the compound from the decontaminated gases.

7. In the removal of radioactive cesium from gases containing it the method which comprises contacting the gases with a refractory silicate which reacts irreversibly with the cesium to form a thermally stable compound containing it, heating the silicate at a temperature of 120 to 1350° C. to cause the irreversible reaction and separating the compound from the decontaminated gases.

References Cited in the file of this patent

FOREIGN PATENTS 3,244    Great Britain _____ of 1912

OTHER REFERENCES

Bruce et al.: "Process Chemistry, Series III," vol. 2, pages 431, 436, 437 and 449, Pergamon Press, N.Y., 1958.

Mellor: "Comprehensive Treatise on Inorganic and Theoretical Chemistry," Longmans, Green and Co., N.Y., 1937, vol. 15, p. 510.